United States Patent
Dame et al.

(10) Patent No.: US 9,744,896 B2
(45) Date of Patent: Aug. 29, 2017

(54) SLIDE ROOM FOR RECREATIONAL VEHICLE

(71) Applicant: Composite Solutions, Inc., Junction City, OR (US)

(72) Inventors: Dennis Dame, Harrisburg, OR (US); Jeffrey Chase, Junction City, OR (US)

(73) Assignee: Composite Solutions, Inc., Eugene, OR (US)

( * ) Notice: Subject to any disclaimer, the term of this patent is extended or adjusted under 35 U.S.C. 154(b) by 0 days.

(21) Appl. No.: 14/940,003

(22) Filed: Nov. 12, 2015

(65) Prior Publication Data

US 2016/0137170 A1 May 19, 2016

Related U.S. Application Data

(60) Provisional application No. 62/079,145, filed on Nov. 13, 2014.

(51) Int. Cl.
  *B60S 1/66* (2006.01)
  *B60P 3/34* (2006.01)
  *B60J 10/00* (2016.01)

(52) U.S. Cl.
  CPC .................. *B60P 3/34* (2013.01); *B60J 10/00* (2013.01); *B60S 1/66* (2013.01)

(58) Field of Classification Search
  CPC ................ B60P 3/34; B60J 10/00; B60S 1/66
  USPC ....................................................... 296/26.13
  See application file for complete search history.

(56) References Cited

U.S. PATENT DOCUMENTS

| 6,966,590 | B1 | 11/2005 | Ksiezopolki et al. |
| 7,380,854 | B1 | 6/2008 | Hanser et al. |
| 7,419,202 | B1 | 9/2008 | Hanser et al. |
| 7,540,116 | B1 | 6/2009 | Martinson |
| 7,614,676 | B2 * | 11/2009 | Ksiezopolski ............ B60P 3/34 296/171 |
| 7,614,677 | B2 | 11/2009 | Ksiezopolski et al. |
| 7,651,144 | B2 | 1/2010 | Clark et al. |
| 8,366,168 | B1 | 2/2013 | Ksiezopolski et al. |
| 8,408,625 | B1 | 4/2013 | Ksiezopolski et al. |

(Continued)

OTHER PUBLICATIONS

PDF of http://www.hwhcorp.com/sweepeze3.html, "HWH Sweepeze", HWH Corporation, 1 page, archived Aug. 24, 2007.

*Primary Examiner* — Joseph D Pape
*Assistant Examiner* — Dana Ivey
(74) *Attorney, Agent, or Firm* — Klarquist Sparkman, LLP (57) ABSTRACT

An assembly for reducing the conveyance of material on a top surface of a secondary structure movable into and out of an opening in a primary structure includes a mounting member including a first portion coupled to an upper interior surface of the opening of the primary structure and a second portion situated on an exterior of the primary structure adjacent the opening. The assembly further includes a pivotable member coupled to the second portion of the mounting member and being pivotable between an open position and a closed position corresponding to an extended position and a retracted position of the secondary structure with respect to the primary structure, and a flexible seal member coupled to the pivotable member and movable therewith such that when the secondary structure is extended the seal member engages the top surface of the secondary structure at a location offset from the opening.

20 Claims, 9 Drawing Sheets

(56) References Cited

U.S. PATENT DOCUMENTS

2013/0269262 A1* 10/2013 Siegel ................... B60R 13/08
49/492.1

* cited by examiner

SLIDE ROOM FOR RECREATIONAL VEHICLE

CROSS REFERENCE TO RELATED APPLICATION

This application claims the benefit of U.S. Provisional Patent Application No. 62/079,145, filed Nov. 13, 2014, which is hereby incorporated herein by reference in its entirety.

FIELD

The present application relates to movable covers for slide-rooms of recreational vehicles or other structures.

BACKGROUND

Many recreational vehicles (RV) include slide-out rooms or slide-rooms that are movable between a retracted position and an extended position with respect to the exterior wall of the RV. Such slide-rooms typically include a peripheral flange that can aid in sealing the opening in the wall of the RV in which the slide-room is received when the slide-room is in the retracted position. However, when the slide-room is in the extended position, water, snow, debris, etc., can collect on the upper surface of the slide-room. When the slide-room is moved to the retracted position, the portion of the peripheral flange adjacent the upper surface of the slide-room can act as a barrier to the removal of such water, snow, debris, etc., which can cause these materials to be conveyed inside the RV as the slide-room is retracted. Accordingly, improvements to RV slide-rooms are desirable.

SUMMARY

Certain embodiments of the disclosure concern assemblies including a movable cover for a slide-room. In a representative embodiment, an assembly for reducing the conveyance of material on a top surface of a secondary structure movable into and out of an opening in a primary structure comprises a mounting member including a first portion coupled to an upper interior surface of the opening of the primary structure and a second portion situated on an exterior of the primary structure adjacent the opening. The assembly further comprises a pivotable member coupled to the second portion of the mounting member and being pivotable between an open position and a closed position corresponding to an extended position and a retracted position of the secondary structure with respect to the primary structure, and a flexible seal member coupled to the pivotable member and movable therewith such that when the secondary structure is extended the seal member engages the top surface of the secondary structure at a location offset from the opening.

In another representative embodiment, an assembly for reducing the conveyance of material on a top surface of a secondary structure movable into and out of an opening in a primary structure comprises a mounting member coupled to the primary structure adjacent the opening, and a pivotable member coupled to the mounting member and being pivotable between an open position and a closed position corresponding to an extended position and a retracted position of the secondary structure with respect to the primary structure. The assembly further comprises a locking member coupled to the pivotable member and movable therewith, the locking member being configured to engage an upper edge portion of a peripheral flange of the secondary structure when the secondary structure is in the retracted position so as to retain the pivotable member in the closed position until the secondary structure is moved to the extended position.

In another representative embodiment, a recreational vehicle comprises a vehicle body, a slide room disposed in the vehicle body and movable relative to the vehicle body through an opening therein between an extended position and a retracted position, and a mounting member coupled to an upper interior surface of the opening of the vehicle body. The recreational vehicle further comprises a pivotable member coupled to the mounting member and configured to engage a top surface of the slide room when the slide room is extended. The pivotable member is pivotable between an open position and a closed position corresponding to the extended position and the retracted position of the slide room. The recreational vehicle further comprises a locking member coupled to the pivotable member and movable therewith, the locking member being configured to engage an upper edge portion of a peripheral flange of the slide room when the slide room is in the retracted position so as to retain the pivotable member in the closed position until the secondary structure is moved to the extended position.

The foregoing and other objects, features, and advantages of the disclosed technology will become more apparent from the following detailed description, which proceeds with reference to the accompanying figures.

DETAILED DESCRIPTION

The present disclosure concerns embodiments of a movable cover for a slide-room for a vehicle. As used herein, the term "vehicle" refers generally to any vehicle that has a power source (e.g., motor or engine) or a towable vehicle that is coupled to a driven vehicle for travelling from place to place. A vehicle can include, without limitation, a tractor-trailer, a folding camping trailer, a truck camper, a travel trailer, a fifth wheel travel trailer, a sport utility recreational vehicle, a motorhome (e.g., class A, B, and C motorhomes), a horse trailer, a military trailer, or a utility trailer, to name a few. The assemblies disclosed herein can also be installed in less mobile structures, such as mobile homes, house boats, mobile offices or command centers. If desired, the assemblies can also be installed in permanent structures, such as houses, stores, etc.

Figure 1:
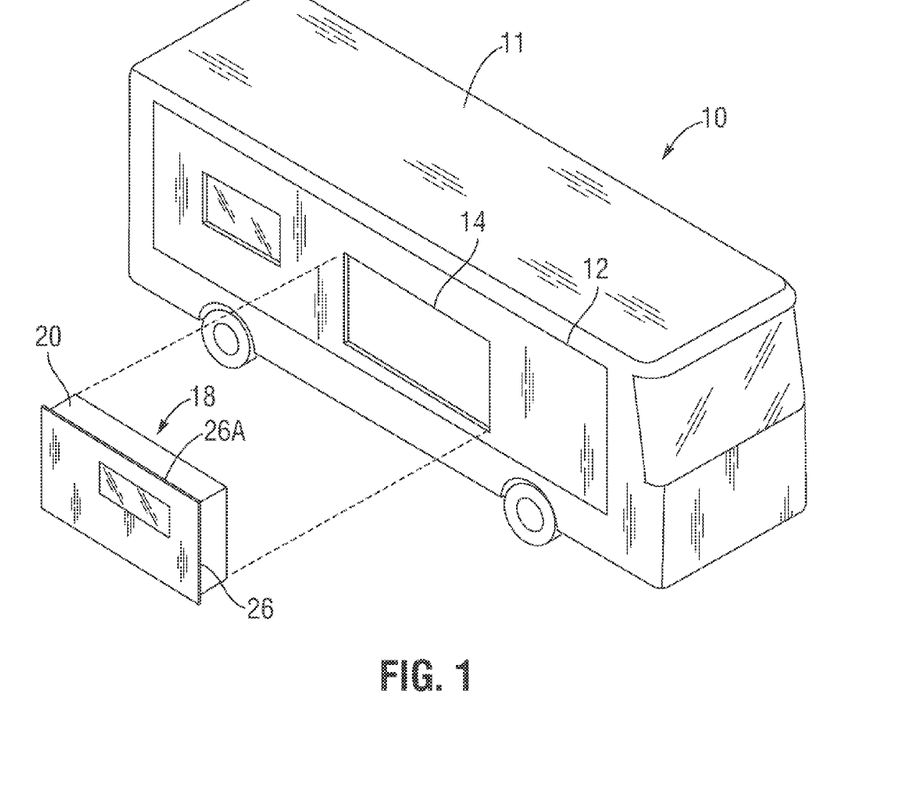
FIG. 1 illustrates a representative embodiment of a recreational vehicle include a slide-room.

FIG. 1 illustrates a vehicle 10 in the form of a recreational vehicle (RV) having a primary structure or vehicle body 11. The vehicle body includes an exterior wall 12 defining an opening 14 configured to receive a secondary structure configured as a slide-room 18. The slide-room 18 can be movable between a retracted position and an extended position, and can include a peripheral wall flange 26. The peripheral wall flange 26 can have a top portion 26A adjacent an upper surface 20 of the slide-room 18. When the slide-room 18 is extended, material such as rain water, snow, and/or debris may collect on the upper surface 20 of the slide-room. As the slide-room 18 is retracted, the top portion 26A of the flange 26 can act as a barrier to removal of material from the upper surface 20 of the slide-room, which can cause such materials to be conveyed inside the RV.

Figure 2:
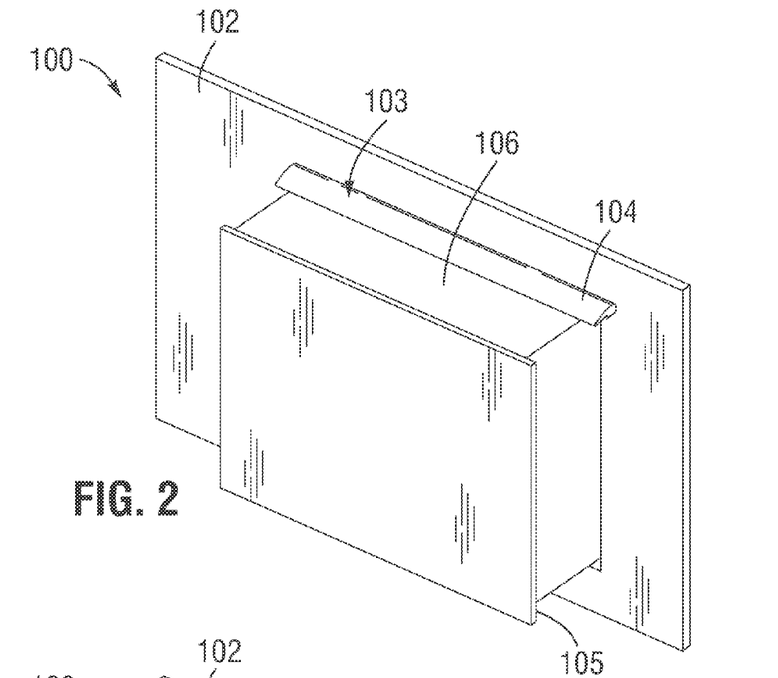
FIGS. 2 and 3 illustrate a representative embodiment of a slide-room received in an opening of a wall of a recreational vehicle and including a pivotable member.
Figure 3:
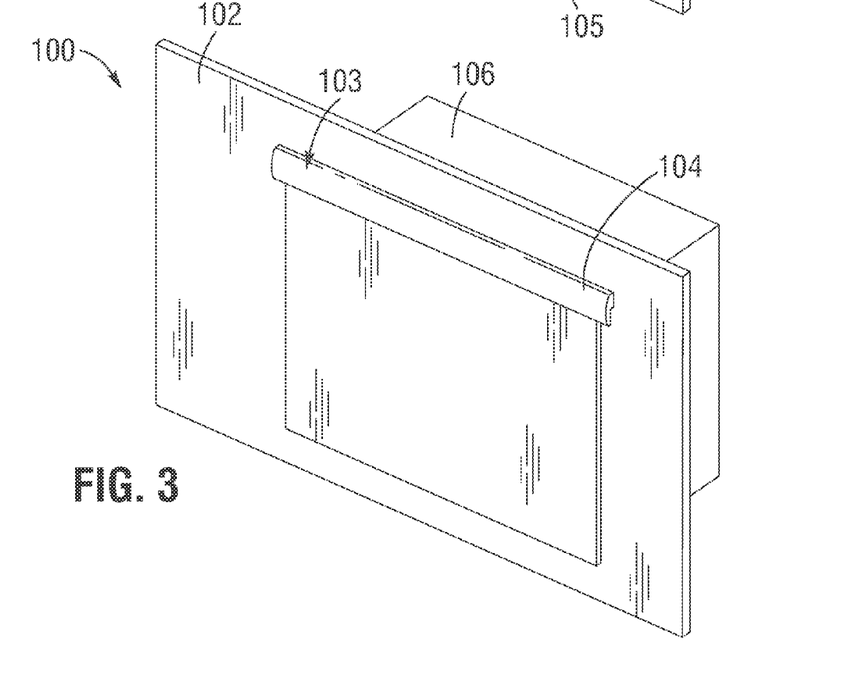
Figures 4A, 4B:
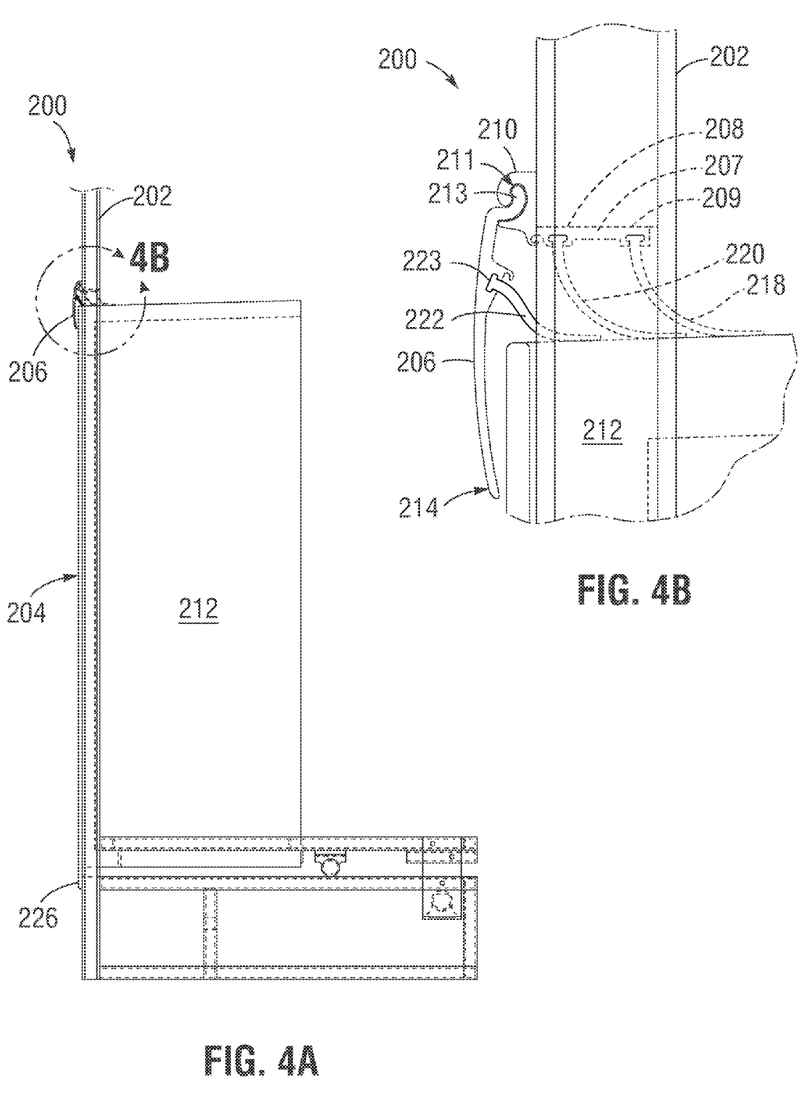
FIGS. 4A and 4B are cross-sectional views illustrating another embodiment of a slide-room received in an opening of a wall of a recreational vehicle in a retracted position and a pivotable member in a closed position.

FIGS. 2 and 3 illustrate a secondary structure configured as a slide-room 100 received in a wall 102 of a primary structure, such as a recreational vehicle, according to one embodiment. The slide-room 100 can include a three-sided peripheral flange 105 that extends along the bottom portion and side portions of the slide-room 100. The RV wall 102 can have an assembly 103 including a pivotable member 104 pivotally coupled to the wall 102 of the RV above the opening in which the slide-room 100 is received and movable between a closed position and an open position as the slide-room is extended and retracted. For example, the pivotable member 104 can be configured to extend over an upper portion of the slide-room 100 when the slide-room is in the retracted position. In this manner, when the slide-room is extended, the end portion of the pivotable member 104 can contact an upper surface 106 of the slide-room, causing the pivotable member 104 to move to the open position as shown in FIG. 2. In this manner, as the slide-room 100 is moved from the extended position to the retracted position, the pivotable member 104 can contact and remove, for example, water, snow, debris, etc., from the upper surface 106 of the slide-room. The pivotable member 104 can also cover an upper portion of the opening in the wall 102 in which the slide-room 100 is received to help reduce ingress of unwanted material into the RV when the slide-room is in the retracted position. In this manner, the peripheral flange 105 need not extend along the upper surface 106 of the slide-room 100.

Figures 5A, 5B:
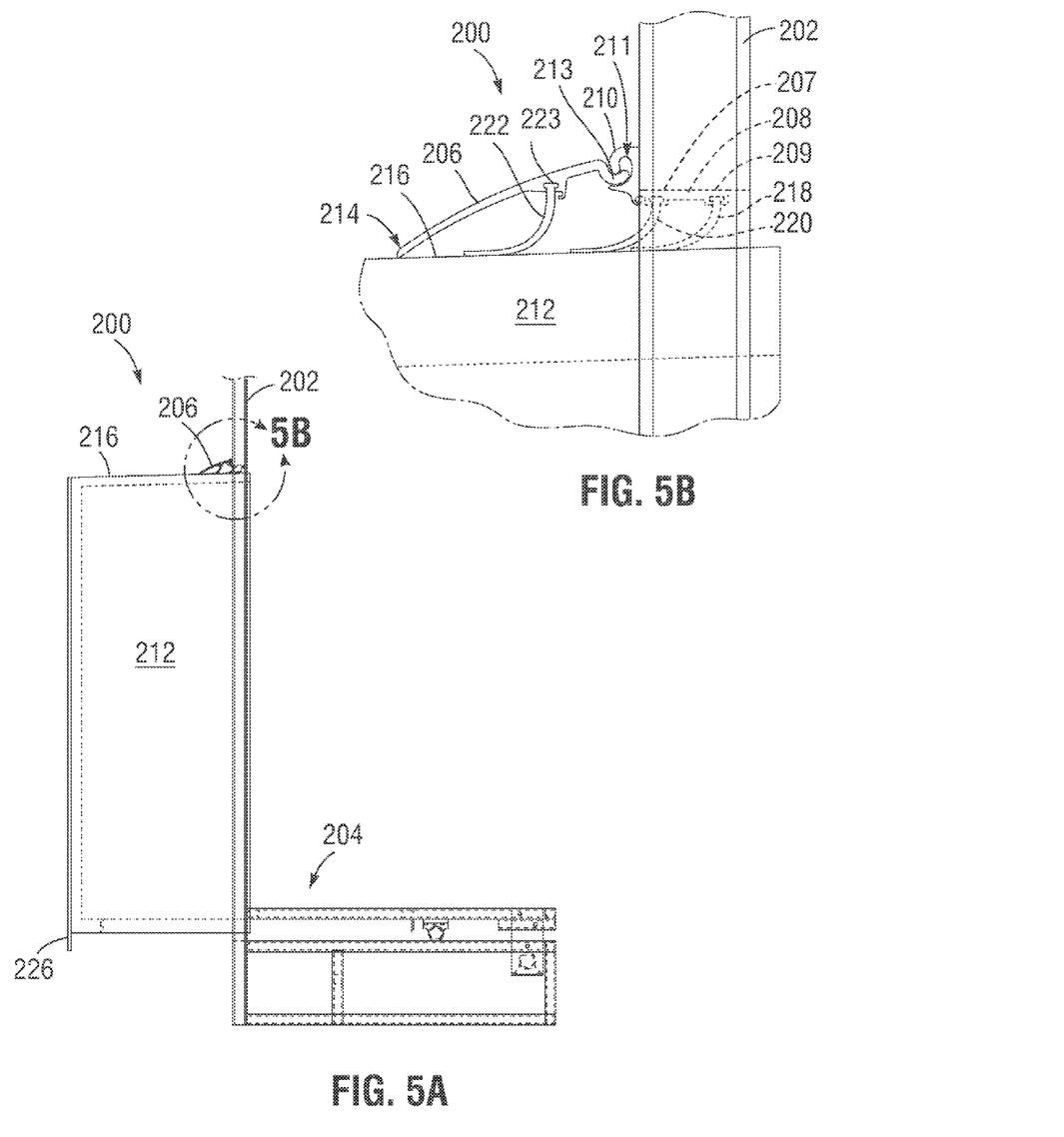
FIGS. 5A and 5B are cross-sectional views of the slide-room of FIGS. 4A and 4B in an extended position with the pivotable member in an open position.
Figure 6:
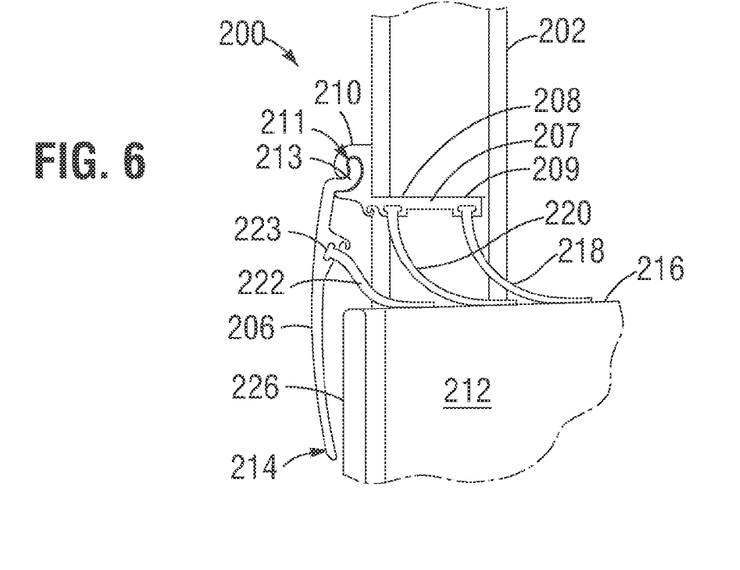
FIG. 6 is a cross-sectional view illustrating the slide-room in the retracted position and the pivotable member in the closed position.
Figure 7:
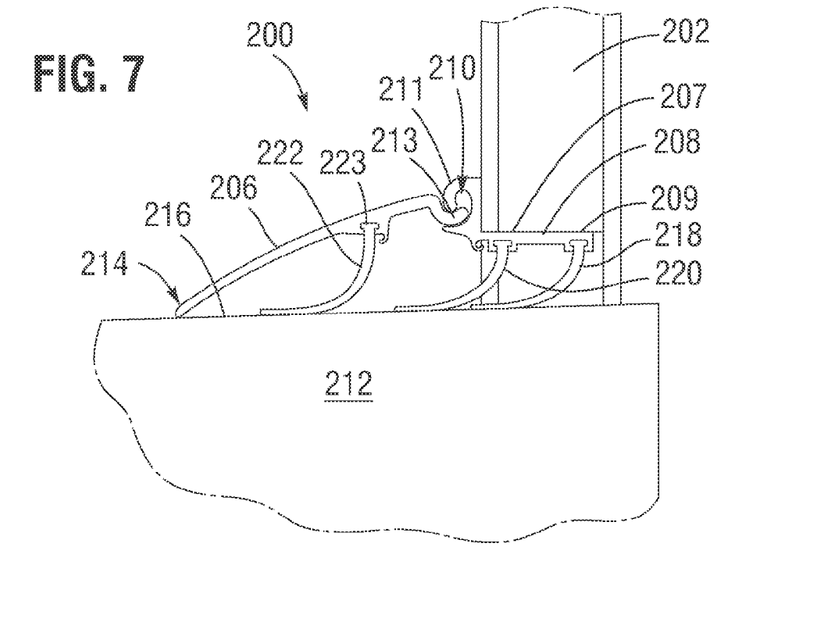
FIG. 7 is a cross-sectional view illustrating the slide room in the extended position and the pivotable member in the open position.

FIGS. 4A, 4B, 5A, 5B, 6, and 7 illustrate an embodiment of an assembly 200 mountable to a wall 202 of a primary structure such as an RV 204 adjacent a secondary structure, such as a slide-room 212. The assembly 200 can include a pivotable member 206 and a mounting member or bracket 207 comprising a first internal flange portion 208 and a second external hinge portion 210. The pivotable member 206 can be movable between an open position and a closed position corresponding to an (at least partially) extended position and a retracted position, respectively, of the slide-room 212. The pivotable member 206 can be pivotable about the hinge portion 210 such that as the slide-room 212 is extended, a lower portion 214 of the pivotable member 206 can contact an upper surface 216 of the slide-room 212 and cause the pivotable member 206 to move into the open position, as shown in FIGS. 5A, 5B, and 7. For example, in the illustrated embodiment, the hinge portion 210 can define a curved groove 211, which can be configured to receive a curved extension portion 213 of the pivotable member 206.

The flange portion 208 can be mounted to an upper interior surface 209 of an opening in the wall 202 of the RV, and can include one or more seal members configured to engage the upper surface 216 of the slide-room 212. In the embodiment shown, the flange portion 208 includes two flexible and/or deflectable seal members 218, 220, which can help to prevent water, debris, snow, etc., disposed on the upper surface 216 of the slide-room 212 from entering the RV.

In particular embodiments, the mounting bracket 207 comprises a one-piece, unitary construction. As used herein, the terms "integrally formed" and "unitary construction" refer to a one-piece construction that does not include any adhesive, welds, fasteners, or other means for securing separately formed pieces of material to each other. For example, the mounting bracket 207 can be an extruded piece of aluminum, extruded or molded plastic, etc. In other embodiments, the flange 208 and the hinge portion 210 can be separately formed components that are then connected to each other using, for example, suitable fasteners. In yet other embodiments, the hinge portion 210 need not be connected to the flange portion 208.

In some embodiments, the pivotable member 206 can also include a flexible and/or deflectable seal member 222 configured to engage the upper surface 216 of the slide-room 212, as shown in FIGS. 4A, 4B, 5A, 5B, 6, and 7. The seal member 222 can be configured such that when the slide-room 212 is extended, the seal member 222 can engage the upper surface 216 of the slide-room 212 at a location offset from the opening of the wall 202 (see, e.g., FIGS. 5B and 7). In this manner, the seal member 222 alone and/or the seal member 222 in combination with the lower portion 214 of the pivotable member 206 can engage material disposed on the upper surface 216 of the slide-room 212 and deflect or remove the material from the upper surface 216 as the slide-room 212 moves into the retracted position. Any material that is not removed by the seal member 222 can then be engaged by the seal members 218 and/or 220 and prevented from being conveyed further into the RV. In some embodiments, the seal member 222 can be coupled to the pivotable member 206 by, for example, being received in a channel or recess 223 defined in the pivotable member 206, or by adhesive, one or more fasteners, or any combination thereof.

The seal member 222 and/or the seal members 218, 220 can be made from any suitable flexible or deflectable material such as, for example, natural or synthetic rubber, or any of various elastomers, such as silicone rubber, urethane, etc.

Figure 8:
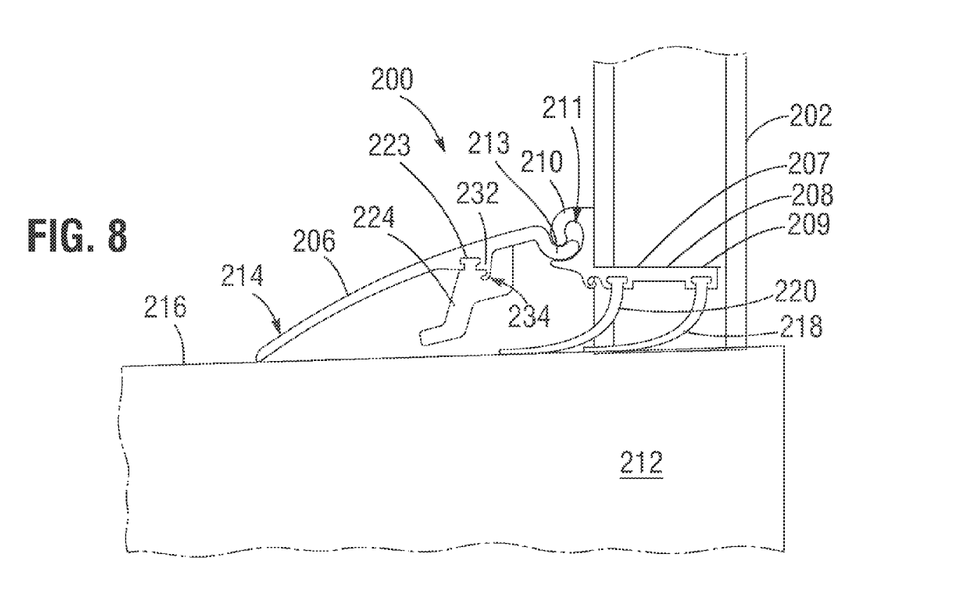
FIG. 8 is a cross-sectional view of the slide room in the extended position and the pivotable member in the open position and including a locking member.
Figure 9:
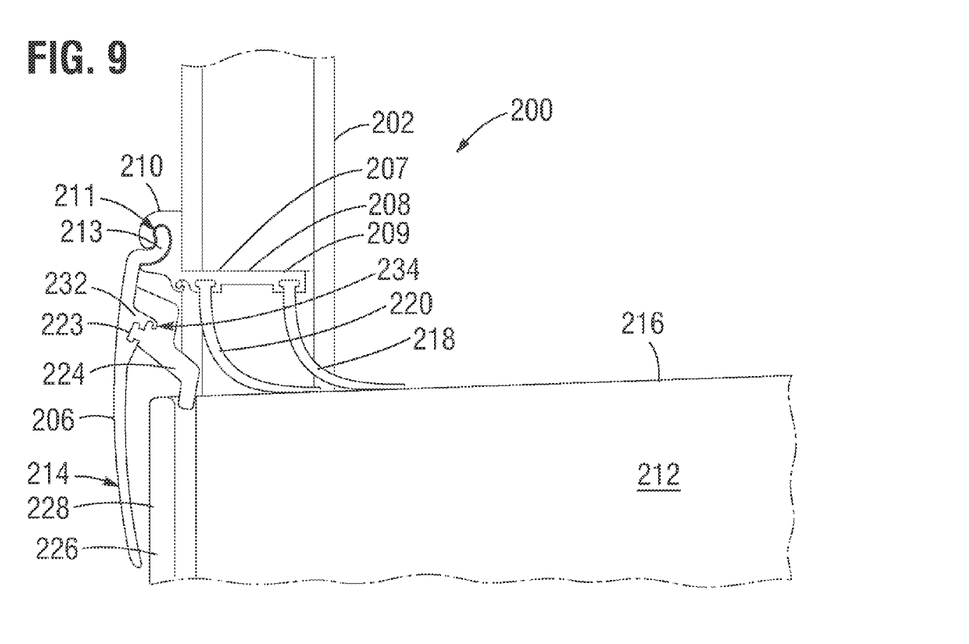
FIG. 9 is a cross-sectional view of the slide room in the retracted position and the pivotable member in the closed position with the locking member engaging flange of the slide-room.
Figure 10:
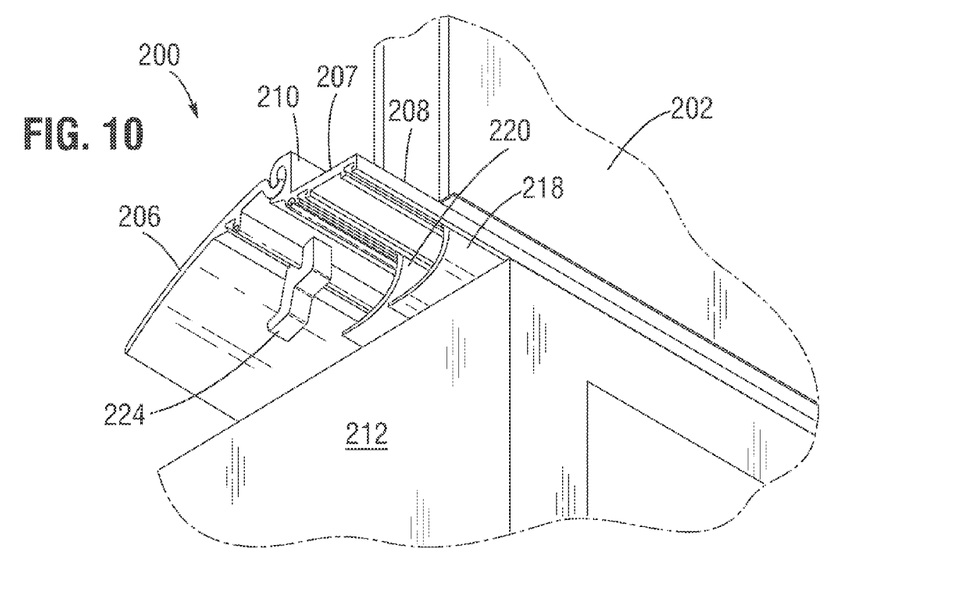
FIGS. 10 and 11 are perspective views of the slide-room in the extended and retracted position, respectively, illustrating operation of the locking member.
Figure 11:
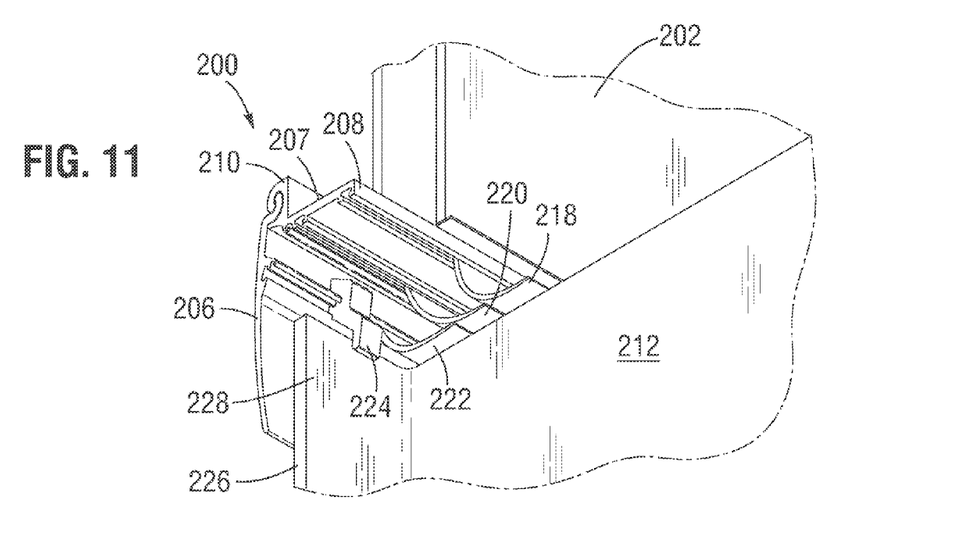

Motion of the vehicle when traveling and/or wind pressure can cause independent movement of the pivotable member. Thus, with reference to FIGS. 8-11, the assembly 200 can include one or more locking members 224 coupled to the pivotable member 206 to resist inadvertent movement of the pivotable member. The locking members 224 can be configured to engage side portions of a three-sided peripheral flange 226 of the slide-room 212 when the slide-room is in the closed position, as best shown in FIGS. 9 and 11. In some embodiments, the pivotable member 206 can include two locking members 224 positioned at opposite ends along the length of the pivotable member 206 and configured to receive respective side portions such as side portion 228 of the peripheral flange 226 as the slide-room 212 is moved to the retracted position. In this manner, the locking members 224 can help to prevent movement of the pivotable member 206 when the slide-room is retracted and the RV is in motion. When the slide-room is extended, the locking members 224 can disengage from the respective side portions of the peripheral flange 226, allowing the pivotable member 206 to move to the open position, as shown in FIGS. 8 and 10.

In some embodiments, the locking members 224 can comprise, for example, metal, plastic, rubber, or any combination thereof. In some embodiments, the locking members 224 can be coupled to the pivotable member 206 by, for example, one or more fasteners, adhesive, and/or by receipt of the locking members in the channel 223 in the pivotable member. In the illustrated embodiment, a protrusion 232 located on the pivotable member 206 can also be received in a corresponding channel 234 located on each respective locking member 224. In some embodiments, the position of the locking members 224 relative to the peripheral flange 226 can be adjustable to, for example, adjust the strength of the engagement of the locking members 224 with the peripheral flange 226 and/or the point at which the locking members 224 engage or disengage from the peripheral flange when the slide-room is retracted or extended, respectively. For example, in some embodiments, the locking members 224 can include a set screw for adjusting the position and/or orientation of the locking members 224 relative to the peripheral flange 226.

Figure 12:
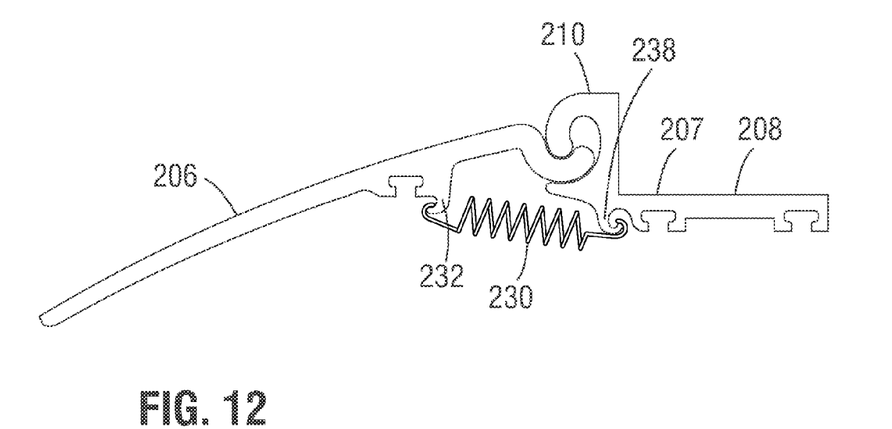
FIGS. 12 and 13 are side elevation views of the pivotable member including a spring member.
Figure 13:
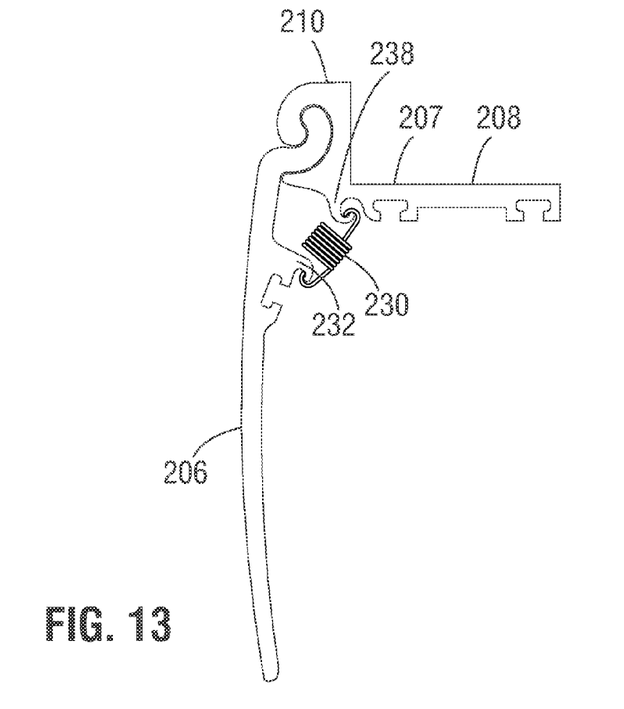

Referring to FIGS. 12 and 13, the assembly 200 can include a spring member 230 to bias the pivotable member 206 toward the closed position. In some embodiments, the spring member 230 can extend between the mounting member 207 and the pivotable member 206. In the illustrated embodiment, the spring member 230 can be coupled to the projection 232 of the pivotable member and a projection 238 of the flange portion 208 of the mounting member 207. In some embodiments, the assembly 200 can include one or more spring members 230 alone, or in combination with, locking members such as the locking members 224.

Figure 14:
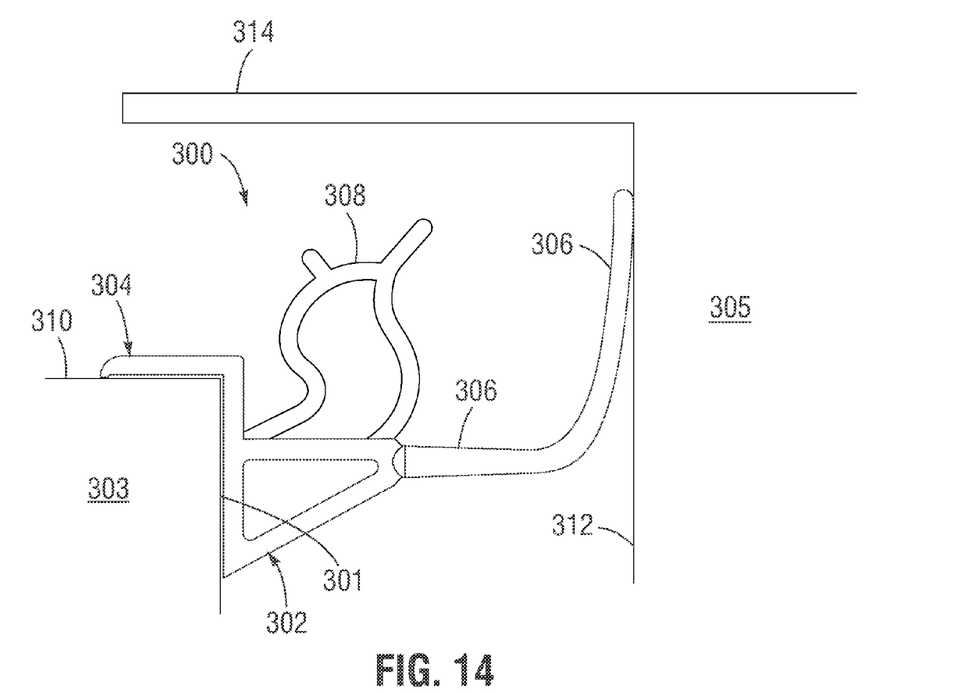
FIG. 14 is a cross-sectional plan view illustrating a seal assembly configured to contact a side wall and a flange of a slide room.

FIG. 14 illustrates an embodiment of a seal assembly 300 configured to extend along a vertically-oriented wall 301 of an opening in an RV 303 for receiving a slide-room 305. The seal assembly 300 can include a mounting portion 302, a flange portion 304, an elongated seal member 306, and a bulb seal member 308. The mounting portion 302 can be mounted on the inside surface of the wall opening, and the flange portion 304 can be mounted to or otherwise contact an exterior wall 310 of the RV. In some embodiments, the mounting portion 302 can be an extruded member having a triangular cross-section. The elongated seal member 306 can be mounted to the mounting portion 302, and can extend across the opening to contact a side wall 312 of the slide-room 305. In this manner, the elongated seal member 306 can engage and remove material (e.g., water) from the side wall 312 of the slide-room 305 as the slide-room is moved from the extended position to the retracted position.

The bulb seal member 308 can be mounted to the mounting portion 302 and can extend outwardly with respect to the slide-room opening to engage a peripheral flange 314 of the slide-room 305 when the slide-room is in the retracted position. In this manner, the bulb seal member 308 can seal against the side portions of the peripheral flange 314 when the slide-room is in the retracted position. In some embodiments, each side of a slide-room opening can include a seal assembly such as the assembly 300. Additionally, it should be understood that the seal assembly 300 can be used in combination with any of the slide-rooms and/or cover assemblies described herein.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only preferred examples and should not be taken as limiting the scope of the disclosure. Rather, the scope of the disclosure is defined by the following claims.

What is claimed is:

1. An assembly for reducing the conveyance of material on a top surface of a secondary structure movable into and out of an opening in a primary structure, comprising:
   a mounting member including a first portion coupled to an upper interior surface of the opening of the primary structure and a second portion situated on an exterior of the primary structure adjacent the opening;
   a pivotable member coupled to the second portion of the mounting member and being pivotable between an open position and a closed position corresponding to an extended position and a retracted position of the secondary structure with respect to the primary structure; and a flexible seal member coupled to the pivotable member and movable therewith such that when the secondary structure is extended the seal member engages the top surface of the secondary structure at a location offset from the opening.

2. The assembly of claim 1, further comprising a locking member coupled to the pivotable member and configured to engage an upper edge portion of a peripheral flange of the secondary structure when the secondary structure is in the retracted position to prevent pivoting movement of the pivotable member until the secondary structure is moved to the extended position.

3. The assembly of claim 1, wherein the first portion and the second portion of the mounting member comprise a one-piece, unitary construction.

4. The assembly of claim 1, wherein the second portion of the mounting member includes a hinge portion, and the pivotable member is pivotably coupled to the hinge portion.

5. The assembly of claim 4, wherein the hinge portion of the mounting member defines a curved groove portion configured to receive a curved extension portion of the pivotable member.

6. The assembly of claim 1, further comprising a spring member extending between the pivotable member and the mounting member and configured to bias the pivotable member toward the closed position.

7. The assembly of claim 1, wherein the first portion of the mounting member further comprises one or more flexible seal members located within the opening and configured to contact the top surface of the secondary structure.

8. The assembly of claim 1, further comprising a mounting member coupled to a side wall of the opening in the primary structure and including a flexible elongated seal member configured to contact a side wall of the secondary structure and a bulb seal extending from the mounting member in a direction toward the opening to contact a peripheral flange extending along the side wall of the secondary structure when the secondary structure is in the retracted position.

9. The assembly of claim 1, wherein the primary structure is a vehicle body of a recreational vehicle and the secondary structure is a slide-room.

10. An assembly for reducing the conveyance of material on a top surface of a secondary structure movable into and out of an opening in a primary structure, comprising:
a mounting member coupled to the primary structure adjacent the opening;
a pivotable member coupled to the mounting member and being pivotable between an open position and a closed position corresponding to an extended position and a retracted position of the secondary structure with respect to the primary structure; and
a locking member coupled to the pivotable member and movable therewith, the locking member being configured to engage an upper edge portion of a peripheral flange of the secondary structure when the secondary structure is in the retracted position so as to retain the pivotable member in the closed position until the secondary structure is moved to the extended position.

11. The assembly of claim 10, further comprising a flexible seal member coupled to the pivotable member and movable therewith such that when the secondary structure is extended the seal member engages the top surface of the secondary structure at a location offset from the opening.

12. The assembly of claim 11, wherein the pivotable member defines a channel along at least a portion of a length of the pivotable member, and the seal member and the locking member are mounted in the channel.

13. The assembly of claim 10, wherein the mounting member includes a first portion coupled to an upper interior surface of the opening of the primary structure and a second portion situated on an exterior of the primary structure adjacent the opening, the first and second portions having a one-piece, unitary construction.

14. The assembly of claim 13, further comprising a spring member extending between the pivotable member and the second portion of the mounting member to bias the pivotable member toward the closed position.

15. The assembly of claim 13, further comprising one or more flexible seal members mounted to the first portion of the mounting member within the opening and configured to contact the top surface of the secondary structure.

16. A recreational vehicle, comprising:
a vehicle body;
a slide room disposed in the vehicle body and movable relative to the vehicle body through an opening therein between an extended position and a retracted position;
a mounting member coupled to an upper interior surface of the opening of the vehicle body;
a pivotable member coupled to the mounting member and configured to engage a top surface of the slide room when the slide room is extended, the pivotable member being pivotable between an open position and a closed position corresponding to the extended position and the retracted position of the slide room; and
a locking member coupled to the pivotable member and movable therewith, the locking member being configured to engage an upper edge portion of a peripheral flange of the slide room when the slide room is in the retracted position so as to retain the pivotable member in the closed position until the secondary structure is moved to the extended position.

17. The recreational vehicle of claim 16, further comprising a flexible seal member coupled to the pivotable member and movable therewith such that when the slide room is extended the seal member engages the top surface of the slide room at a location offset from the opening.

18. The recreational vehicle of claim 17, wherein the pivotable member defines a channel along at least a portion of a length of the pivotable member, and the seal member and the locking member are mounted in the channel.

19. The recreational vehicle of claim 16, wherein the mounting member includes a first portion coupled to the upper interior surface of the opening of the vehicle body and a second portion situated on an exterior of the primary structure adjacent the opening, the first and second portions having a one-piece unitary construction.

20. The recreational vehicle of claim 19, further comprising one or more flexible seal members mounted to the first portion of the mounting member within the opening and configured to contact the top surface of the slide room.

* * * * *